INVENTOR
Gerrit P. Brouwer
Johannes van der Wal
BY
Frank R. Trifari
AGENT 3,293,082
THERMO-ELECTRIC DEVICE FOR MEASURING
THERMAL RADIATION ENERGY
Gerrit Pieter Brouwer and Johannes van der Wal, Eindhoven, Netherlands, assignors to North American Philips Company, Inc., New York, N.Y., a corporation of Delaware
Filed Sept. 6, 1960, Ser. No. 54,088
Claims priority, application Netherlands, Sept. 22, 1959, 243,627
16 Claims. (Cl. 136—206)

This invention relates to a thermo-electric device for measuring thermal radiation energy and, more particularly, to such a device comprising one or more thermo-couples in which the junction of each thermo-couple is exposed to radiation (hot junction) and the non-exposed junctions are in substantially intimate thermal contact with a metal body having a high heat or thermal capacity. The thermo-couples may be separated from this body by a thin layer of electrically insulating material.

The features and objects of this invention will become apparent by reference to the following description taken in conjunction with the accompanying drawing, in which.

Figure 1:
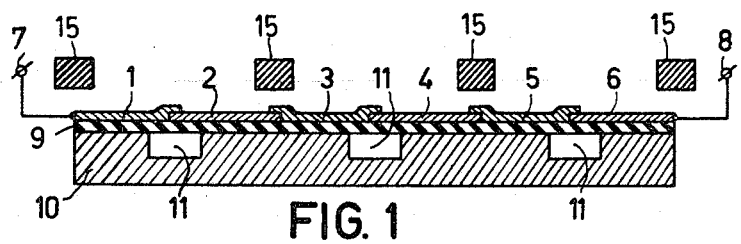
FIG. 1 is a cross-sectional view of an embodiment of this invention.
Figure 2:
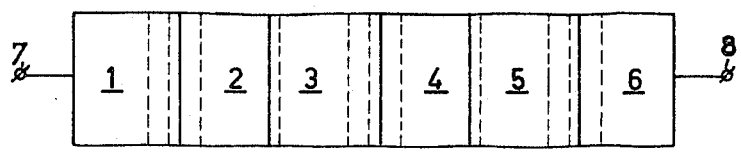
FIG. 2 is a plan view of the embodiment illustrated in FIG. 1.

For the sake of explanation, in the figures it is assumed that three thermo-couples are connected in series, although it may be preferable to connect a greater number of them in series. Referring now to FIGS. 1 and 2, there are illustrated thermo-couples having a strip-shaped structure. In total, six strips 1 to 6 are provided, of which the longitudinal sides are pairwise welded to each other. The strips 1, 3 and 5 all consist of the same material, and strips 2, 4 and 6 all consist of the same material of another type. In a preferred example, an adequate thermoelectric voltage may be obtained, if the first-mentioned strips are made of tellurium and the last-mentioned of bismuth antimonide (SbBi). The thermal conductivity of such materials is comparatively low as compared with metals. The dimensions of the bodies are shown on an enlarged scale in FIGS. 1 and 2 for the sake of clarity. In practice, the thickness of the strips may be of the order of $1\mu$ and the width of each strip may be of the order of 1 mm. The total width and length are so small that the assembly can be easily arranged in a radiation beam so that the total top surface is exposed uniformly.

The junctions between the strips 1 and 2, 3 and 4, 5 and 6 are the hot junctions, which are directly exposed to the radiation. The other junctions are screened by bodies 15, so that they are not heated by the radiation. The voltage to be measured is obtained from output terminals 7 and 8. On the lower side of the combination of thermo-couples is provided a very thin layer 9 of electrically insulating material, e.g. polyvinyl formal (known as Formvar), the product known under the name "Pep" or a cellulose derivative, of which the thickness is also of the order of $1\mu$. Below the layer 9 is provided a body 10 of metal having a high thermal capacity, e.g. Cu, Al or Ag. The heat of the cold junctions is readily conducted away to body 10 because the cold junctions are substantially provided in intimate thermal contact with the body 10 by virtue of their relative close proximity thereto. However, the heat of the hot junctions is less readily conducted away, since at the area of the hot junctions the body is provided with gutter-shaped depressions 11 thus effectuating a relatively larger proximity relationship between the hot junctions and body 10 and thereby reducing the thermal contact between them. In this manner, the depressions 11 act as thermal insulators and thermally insulate the hot junction from the body 10.

The invention, it is to be understood, is not restricted to the structure described above. For example, instead of using strip-shaped elements welded to each other at the edges, use may be made of elements welded at the ends and applied, for example, in staggered positions, on a flat or non-flat substratum.

A thermo-electric device as described above is suitable for use in conjunction with a suitable recording device for detecting variations in the intensity of the incident radiation. One well known use is as a hot-box detector to be mounted alongside a railway track as described in United States Patent No. 2,880,309. Upon the dimensions of the thermo-couples utilized, will depend the rate of intensity variation that can be indicated. For certain applications utilizing the aforedescribed embodiment of FIGS. 1–2 the time constant, i.e. the response time of the aforedescribed embodiment, may still be too high, and a reduction of the time constant by merely reducing the size of the metal strips may not be adequate for these applications. The invention has for another object to provide a further improvement having dimensions of substantially the same size as the embodiment of FIGS. 1–2, but which is capable of responding to more rapid intensity variations as will be explained hereinafter in greater detail.

This further improvement of the invention consists in that between the hot junction and the metal block, on an insulating layer, a thin coating or layer of metal is provided, the properties and the thickness of this coating being such that the time constant is reduced. To this end, for example, aluminum or a different metal with a satisfactory thermal conductivity with a thickness of about $0.5\mu$ may be employed. The thickness should have such a value that the heat conductivity of the layer from a point under the hot joint to the cold joint is appreciably larger than the heat conductivity through the insulating layer. The thickness of the conductive layer should consequently be larger as the thickness of the insulating layer becomes smaller.

With the value of $1\mu$ for heat insulating material, the thickness of the conductive coating can be about $0.5\mu$. In the case of a thickness of the first layer of $2\mu$, the thickness of the conductive layer is about $0.3\mu$. For a thickness of $0.5\mu$ of the first layer, the thickness of the second one is about $0.1\mu$. This coating may be applied by vaporization.

The time constant of the thermo-electric device is proportional to the thermal capacity and inversely proportional to the thermal discharge of the hot junction. It has now been found that with a suitable choice of the metal, and with a suitable proportioning of the device according to the invention, as set forth in the previous paragraph, the heat capacity of the irradiated part of each thermo-couple increases proportionally less than the draining of heat. Therefore the time constant decreases. It is possible to obtain a reduction of the time constant of about 30%.

Figure 3:
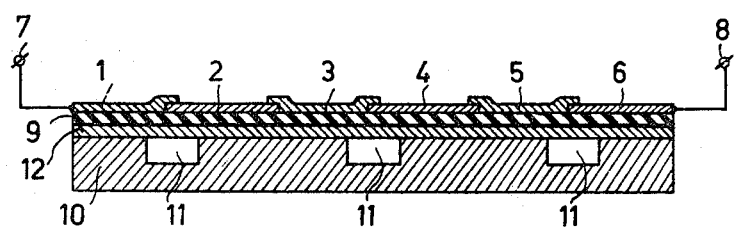
FIG. 3 is a cross-sectional view of another embodiment of this invention.
Figure 4:
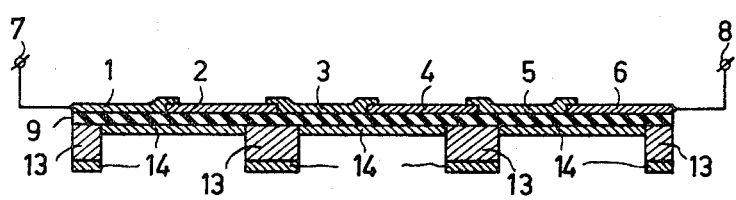
FIG. 4 is a cross-sectional view of still another embodiment of this invention.

The aforementioned improvements of the invention will be now described more fully with reference to the specific embodiments illustrated in FIGS. 3 and 4 in which component parts similar to those shown in FIGS. 1 and 2 are designated by the same reference numerals.

The device shown in FIG. 3 is distinguished from that shown in FIGS. 1 and 2 in that between the layer of insulating material 9 and the metal body 10 there is provided a layer 12 of satisfactory thermal conductive material, particularly metal. This layer may be applied by vaporization on the insulating layer 9. In FIG. 3, the heat screening bodies 15 are not shown for the sake of simplicity, and for the same reason are not illustrated in FIG. 4. The heat of the hot junction, FIG. 3, is conducted away not only by the parts of the thermo-couple but also, via the insulating layer 9 by the applied metal coating or layer 12.

The device shown in FIG. 4 differs from that shown in FIG. 3 in that the metal body 10 is replaced by a grid-shaped structure, consisting of metal rods 13, which are provided at the area of the cold junctions. The application of the thin metal layer by vaporization is performed in this case after the insulating layer 9, with or without the thermo-couples, is arranged on the grid-shaped structure. When applying the metal by vaporization, non-adhering layers 14 are formed, in this case, of which the parts between the grid rods provide the aforesaid draining of heat.

What is claimed is:

1. A thermo-electric device for measuring radiation energy, said device comprising at least one thermo-couple having a pair of substantially flat-shaped first and second members of mutually different thermo-electric materials, said first and second flat-shaped members being disposed in a substantially parallel relationship and aligned to provide at least one common junction at predetermined portions of said members, said one common junction being adapted to be exposed to said radiation energy on one side of said members, metallic means having a high thermal capacity disposed on the other side of said members and adapted to have a first predetermined spaced relationship with respect to said predetermined portions of said members and a second relatively closer spaced relationship with respect to the other portions of said members, means for electrically insulating said first and second members from said high thermal capacity means, and a thin metal layer arranged in heat conducting relationship with said insulating means and said high thermal capacity means and substantially co-aligned with said common junction portions of said first and second members.

2. A thermo-electric device according to claim 1 further comprising radiation shielding means disposed on said one side of said members at positions substantially co-aligned with the respective said other portions thereof.

3. A thermo-electric device for measuring radiation energy, said device comprising at least one thermo-couple having a pair of substantially flat-shaped first and second members of mutually different thermo-electric materials, said first and second flat-shaped members being disposed in a substantially parallel relationship and aligned to provide at least one common junction at predetermined portions of said members, said one common junction being adapted to be exposed to said radiation energy on one side of said members, metallic means having a high thermal capacity disposed on the other side of said members and adapted to have a first predetermined spaced relationship with respect to said predetermined portions of said members and a second relatively closer spaced relationship with respect to the other portions of said members, means for electrically insulating said first and second members from said high thermal capacity means, and a thin metal layer disposed between said means for electrically insulating and said high thermal capacity means.

4. A thermo-electric device for measuring radiation energy, said device comprising at least one thermo-couple having a pair of substantially flat-shaped first and second members of mutually different thermo-electric materials, said first and second flat-shaped members being disposed in a substantially parallel relationship and aligned to provide at least one common junction at predetermined portions of said members, said one common junction being adapted to be exposed to said radiation energy on one side of said members, metallic means having a high thermal capacity disposed on the other side of said members exclusively at said other portions and adapted to have a first predetermined spaced relationship with respect to said predetermined portions of said members and a second relatively closer spaced relationship with respect to the other portions of said members, means for electrically insulating said first and second members from said high thermal capacity means, and a thin metal layer disposed on said means for electrically insulating at positions thereof substantially co-aligned with said predetermined portions of said members.

5. A thermo-electric device for measuring radiation energy, said device comprising a plurality of thermo-couples, each of said thermo-couples having a pair of substantially flat-shaped first and second members of mutually different thermo-electric materials disposed in a substantially parallel relationship and aligned to provide at least one common junction at predetermined portions of the respective members of said pair, said common junctions of said pairs being adapted to be exposed to said radiation energy on one side of said members, metallic means having a high thermal capacity disposed on the other side of said members and adapted to have a first predetermined spaced relationship with the predetermined portions of the respective members of each pair and a respective second relatively closer spaced relationship with the other portions of the respective members of each pair, and means for electrically insulating each of said first and second members from said high thermal capacity means.

6. A thermo-electric device according to claim 5 wherein said pairs of first and second members are adapted to be adjacently aligned in substantially parallel relationship, and said device further comprises radiation shielding means disposed on said one side of the respective members of said pairs at positions substantially co-aligned with the respective said other portions thereof.

7. A thermo-electric device according to claim 5 further comprising a thin metal layer disposed between said means for electrically insulating and said high thermal capacity means.

8. A thermo-electric device according to claim 5 wherein said high thermal capacity means is disposed on said other side exclusively at said other portions, said device further comprising a thin metal layer disposed on said means for electrically insulating at said positions thereof substantially co-aligned with the predetermined portions of the respective members of said pairs.

9. A thermo-electric device responsive to radiant energy, comprising at least one thermocouple element, said thermocouple element comprising first and second flat members composed of different thermoelectric materials, said first and second members being disposed in a co-planar relationship and aligned to provide at least one common junction at predetermined portions of said members, said one common junction being positioned so as to be exposed to said radiant energy on one side of said members, a conductiive member having a high thermal capacity and disposed on the other side of and adjacent said members so as to have a first predetermined spaced relationship with respect to said common junction portions of said members and a second relatively closer spaced relationship with respect to the other portions of said members, electrical insulating means separating said first and second members from said high thermal capacity member, and a thin metal layer arranged in heat conducting relationship with said insulating means and said high thermal capacity member.

10. Apparatus as described in claim 9 wherein said first and second members comprise thin rectangular shaped elements of relatively low thermal conductivity arranged side by side to form said common junction, said high thermal capacity member comprising a metallic block having a recess coextensive with said common junction, and said insulating means comprises a thin flat member having one surface contacting said other side of said first and second members and its opposite surface contacting a portion of said metal block in the vicinity of said other portions of said first and second members.

11. A thermo-electric device responsive to radiant energy, a plurality of thermo-couples each of which comprises first and second relatively flat elongated members composed of different thermo-electric materials, said members being arranged side by side in a co-planar relationship to form a plurality of alternating regions having successive thermojunctions therebetween, alternate ones of said junctions being exposed to said radiant energy on one side of said members, a metallic high thermal capacity member disposed on the other side of and adjacent said members so as to have a first predetermined spaced relationship with respect to said alternate ones of said exposed junctions and a second relatively closer spaced relationship with respect to the other alternate junctions of said members, means for electrically insulating each of said first and second members from said high thermal capacity member, and a thin metal coating contacting said insulating means in areas aligned with said exposed junctions and separated therefrom by said insulating means, said metal coating contacting predetermined portions of said high thermal capacity member.

12. Apparatus as described in claim 11 further comprising means for shielding said other alternate junctions of said members from said radiant energy thereby forming an alternating series of hot and cold junctions comprising said exposed and said shielded junctions, respectively.

13. Apparatus as described in claim 12 wherein said insulating means comprises a thin flat member having one surface thereof in contact with said other side of said thermocouple members and wherein said thin metal coating is affixed to the opposite surface thereof.

14. Apparatus as described in claim 13 wherein said high thermal capacity member comprises a metal block having a flat surface portion containing recesses therein, said metal block being disposed so that said flat surface portions are aligned with said cold junctions and said recesses are aligned with said hot junctions.

15. Apparatus as described in claim 13 wherein the ratio of the thickness of said metal coating to the thickness of said insulating member is such that the heat conductivity of said metal coating between a hot and cold junction is appreciably greater than the heat conductivity through said insulating member.

16. Apparatus as described in claim 12 wherein said high thermal capacity means comprises a first grid-like structure of elongated conductive members each of which is aligned with a corresponding cold junction and wherein said metal coating comprises a second grid-like structure arranged in the areas between said first grid-like structure and aligned with said hot junctions.

References Cited by the Examiner
UNITED STATES PATENTS

| | | | |
|---|---|---|---|
| 2,139,504 | 12/1938 | King | 73—359 |
| 2,246,329 | 6/1941 | Telkes | 136—4 X |
| 2,305,396 | 12/1942 | Volochini | 73—355 |
| 2,472,759 | 6/1949 | Raspet | 73—359 |
| 2,588,254 | 3/1952 | Lark-Horovitz et al. | 136—4.6 |
| 2,671,818 | 3/1954 | Turck | 136—4.23 |
| 2,829,185 | 4/1958 | Macatician | 73—359 |
| 2,851,574 | 9/1958 | Linhart et al. | 73—359 |
| 3,076,051 | 1/1963 | Haba | 136—4 |

WINSTON A. DOUGLAS, *Primary Examiner.*

ISAAC LISANNE, JOHN H. MACK, *Examiners.*

R. F. BEERS, D. L. WALTON, A. B. CURTIS,
*Assistant Examiners.*